United States Patent [19]
Watson

[11] Patent Number: 5,746,112
[45] Date of Patent: May 5, 1998

[54] PISTON FOR TANK

[76] Inventor: M. Burnell Watson, P.O. Box 34, Dorsey, Ill. 62021

[21] Appl. No.: 752,835

[22] Filed: Nov. 20, 1996

[51] Int. Cl.$^6$ .......................... B01D 47/00; B65D 53/00
[52] U.S. Cl. ...................... 92/205; 92/249; 92/256; 277/106; 222/389
[58] Field of Search .................. 92/80, 82, 248, 92/249, 256, 201, 205; 277/106; 222/386, 389

[56] References Cited

U.S. PATENT DOCUMENTS

| | | | |
|---|---|---|---|
| 1,728,591 | 9/1929 | Brauer | 92/205 |
| 1,945,153 | 1/1934 | Marsh | 277/106 X |
| 3,136,228 | 6/1964 | Dailey | 92/249 X |
| 3,589,246 | 6/1971 | Yasunami | 92/205 X |
| 3,828,988 | 8/1974 | Berry | 222/389 |
| 4,211,345 | 7/1980 | Taubenmann | 92/205 X |
| 4,582,329 | 4/1986 | Stalph | 277/106 |
| 4,721,235 | 1/1988 | Watson | 222/389 |
| 5,114,054 | 5/1992 | Watson | 222/389 |
| 5,341,726 | 8/1994 | Watson | 92/80 |

*Primary Examiner*—Hoang Nguyen
*Attorney, Agent, or Firm*—Senniger, Powers, Leavitt & Roedel

[57] ABSTRACT

In an elongate tank for transport or for storage in bulk of semisolid and fluid material such as grease and oil. The tank has an outlet at one end thereof for discharging material contained therein and is of generally cylindric internal cross section. It has a generally cylindric piston sized to slide in the tank and adapted to be moved in a direction toward the outlet thereby to force the material in the tank through the outlet. The piston comprises a piston member which carries an annular elastic seal. The seal has an annular crown projecting radially outwardly from the piston member and engageable with the interior surface of the tank. The seal has a pair of spaced apart legs supporting the crown, and an arrangement for squeezing the legs together to move the crown outwardly and cause it to be pressed against the interior surface of the tank with a pressure such that when the piston member slides in the tank a portion of the crown is maintained in sliding engagement with the interior surface thereby to wipe the material therefrom and to seal the piston member relative to the tank. The piston member is held against canting by at least one anti-canting member extending radially outwardly beyond the periphery of the piston member and spaced axially from the seal for engagement with the interior surface of the tank which permits the piston member to slide freely in the tank.

12 Claims, 2 Drawing Sheets

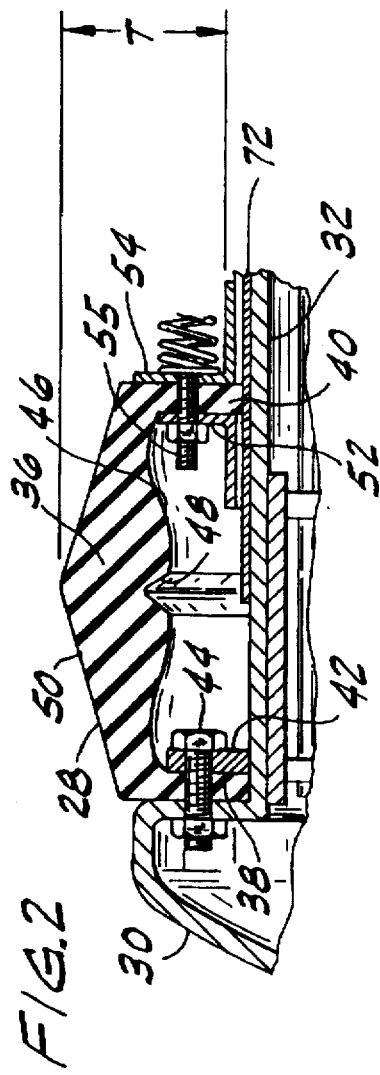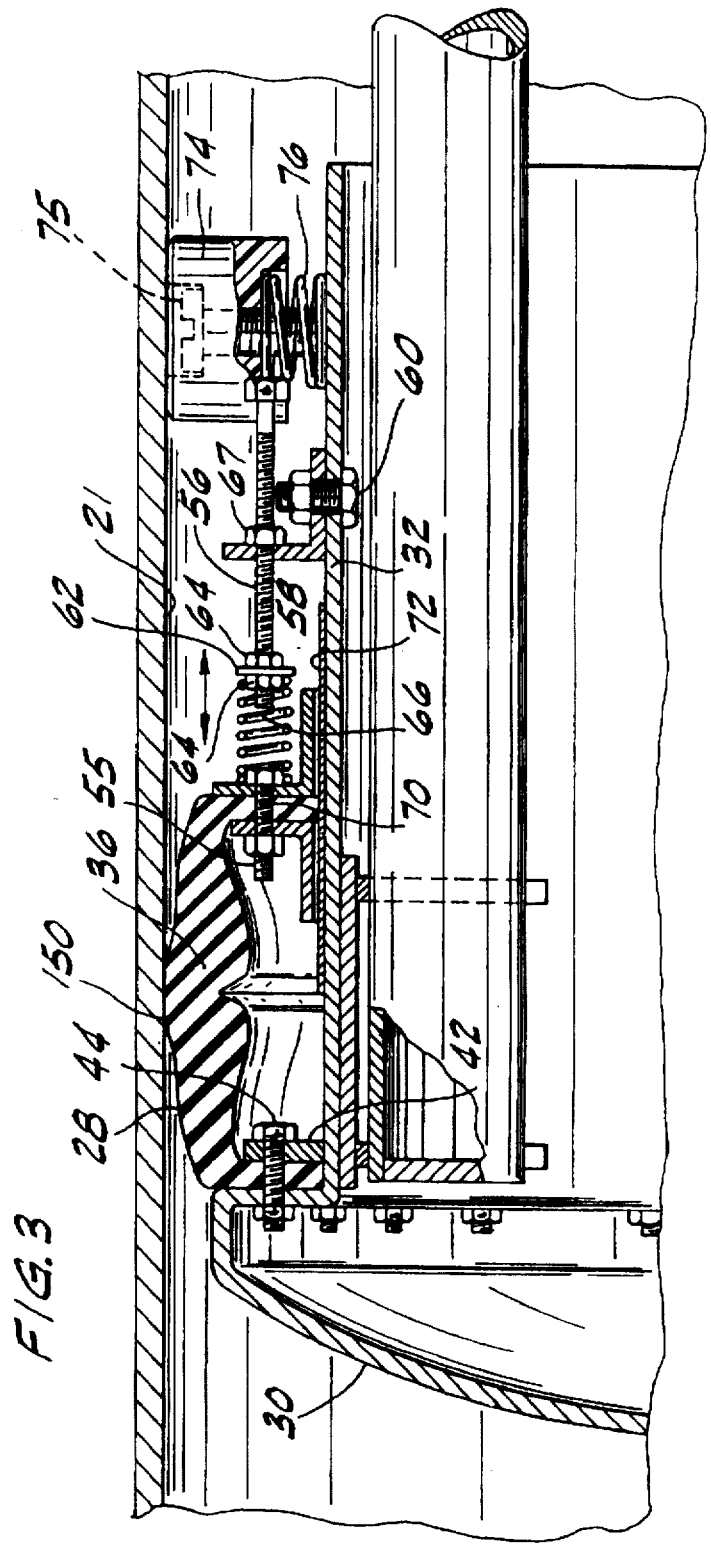

PISTON FOR TANK

BACKGROUND OF THE INVENTION

This invention relates generally to a system for transporting or storing semisolid materials, such as grease or ground or comminuted food products, and liquid materials, such as oil or printers ink, in bulk quantities, and more particularly to a tank adapted for quickly and efficiently unloading semisolid or liquid material contained therein.

U.S. Pat. Nos. 4,721,235, 5,114,054 and 5,341,726 (incorporated herein by reference) disclose a tank for bulk transport and storage of semisolid and liquid materials. The tank has a follower piston with a pneumatically expandable rubber seal at one end thereof for sealing the piston relative to the tank while accommodating changes in interior cross-section of the tank and means, such as a plurality of pads fastened to the piston and extending radially outwardly therefrom, for preventing canting of the piston as it moves within the tank.

When the tank is new its interior surface closely approximates a circular cylinder with little variance of the inside diameter of the tank. An exemplary tank has an inside tank diameter of approximately seventy inches and in the foregoing patents utilizes an air pressure of about 10–12 psig in the seal to properly expand the seal against the tank's interior surface. As the tank gets older, imperfections (such as out of round areas caused by sagging of the tank, or dents or "dings") may form resulting in increasingly larger variations in the inside diameter of the tank. To ensure that the entire surface of the tank is wiped, it may be necessary to increase air pressure in the seal to as much as 50 psig to accommodate these imperfections.

Although the increase in air pressure expands the seal to accommodate portions of the tank having increases in tank diameter, forces exerted by the seal on portions of the tank having reductions in tank diameter are much greater than necessary to wipe the tank. These forces result in high frictional forces tending and tend to cause the seal to wear and to scuff.

Also, because of the outward expansion of the seal, the high frictional forces, and the shape of the seal, axial movement of the piston relative to the tank may cause the crown of the seal to shift axially relative to the piston and be pinched thereby resulting in an accelerated wear and shortened life of the pneumatically expandable seal and/or resulting in gouging of the seal. Also, the pneumatically expandable seals can develop leaks and must be serviced periodically.

SUMMARY OF THE INVENTION

Among the several objects of the invention may be noted the provision of an improved piston for a tank for transport and storage of a semisolid or fluid material in which the piston is movable in the tank to force the materials out an outlet of the tank; the provision of such a piston having an improved seal which is not inflatable, but is capable of effectively accommodating variances in the interior diameter of the tank; the provision of such a piston in which the seal is configured for reducing the rubbing force between the seal and interior surface of the tank; the provision of such a piston in which the seal is configured to limit axial movement of the seal relative to the piston; the provision of such a piston in which the seal is configured to flex radially inwardly when the interior surface of the tank exerts a force on the crown as the piston slides in the tank; the provision of such a piston which is reliable in operation and relatively simple and inexpensive in construction; and the provision of such a piston which is relatively easy to assemble and insert into the tank and does not need the servicing that is required for inflatable seals.

The piston of this invention is for use in an elongate tank for transport or for storage in bulk of semisolid and fluid materials, such as grease and oil. The tank has a generally cylindric interior surface and an outlet at one end thereof for discharging material contained therein. The piston is generally cylindric and sized to slide in the tank and is movable in a direction toward the outlet to force material in the tank through the outlet. The piston comprises a piston member which carries an annular elastic seal having a crown which projects radially outwardly from the piston member and is engageable with the interior surface of the tank. The seal has a pair of spaced apart legs supporting said crown. An arrangement is provided for squeezing the legs together to move the crown outwardly to cause it to be pressed against the interior surface of the tank with a pressure such that when the piston member slides in the tank a portion of the crown is maintained in sliding engagement with the interior surface thereby to wipe the material therefrom and to seal the piston member relative to the tank. The piston further includes anti-canting members extending radially outwardly beyond the periphery of the piston member and spaced axially from the seal for engagement with the interior surface of the tank for holding the piston member against canting in the tank while permitting the piston member to slide freely in the tank.

These and other advantages and features of the present invention will be in part apparent and in part pointed out hereinafter.

BRIEF DESCRIPTION OF THE DRAWINGS

FIG. 2 is an enlarged section view of a portion of the piston of FIG. 1 showing the elastic seal of the piston;

FIG. 3 is an enlarged section view of a portion of the piston with the seal of FIG. 2 flexed radially inwardly.

Corresponding reference characters indicate corresponding parts throughout the several views of the drawings.

DETAILED DESCRIPTION OF A PREFERRED EMBODIMENT

Figure 1:
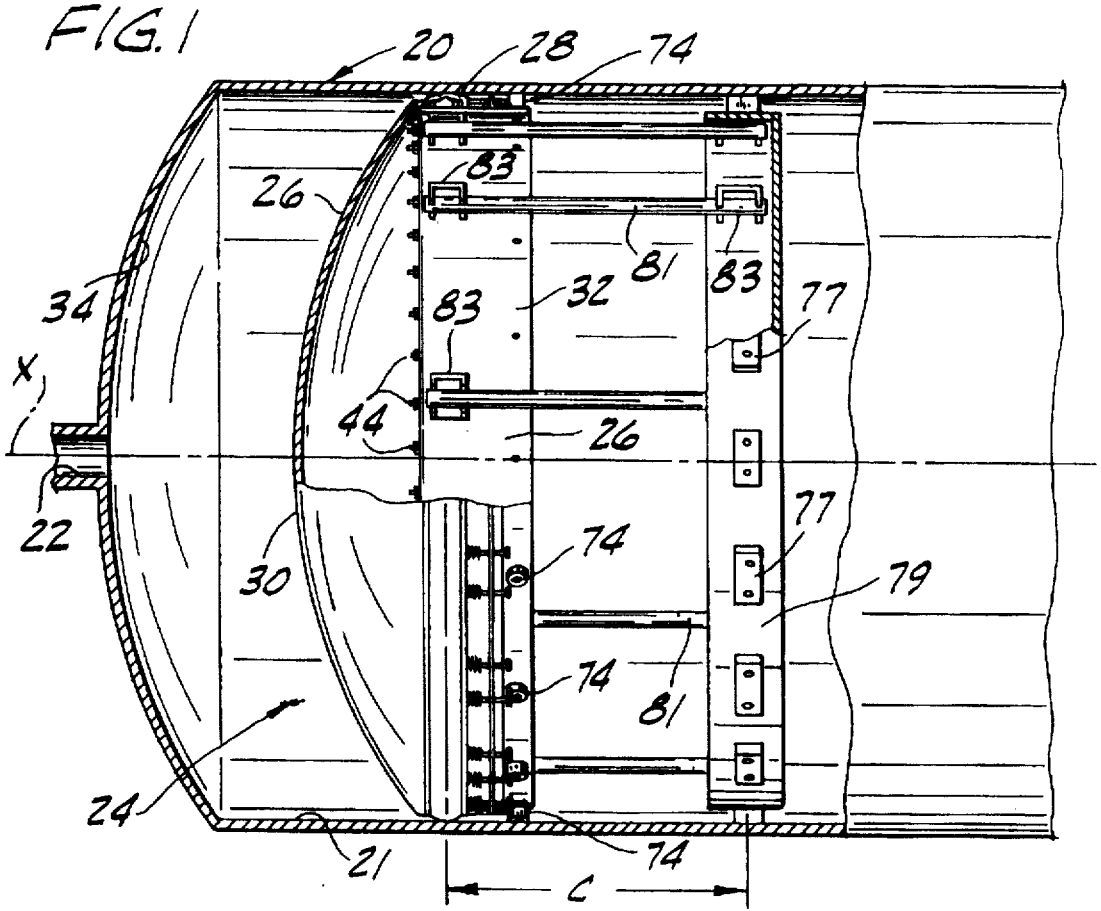
FIG. 1 is a longitudinal cross-section of an end portion of a tank of the present invention showing a piston of the present invention, partially broken away to illustrate details, movable within the tank.
Figure 4:
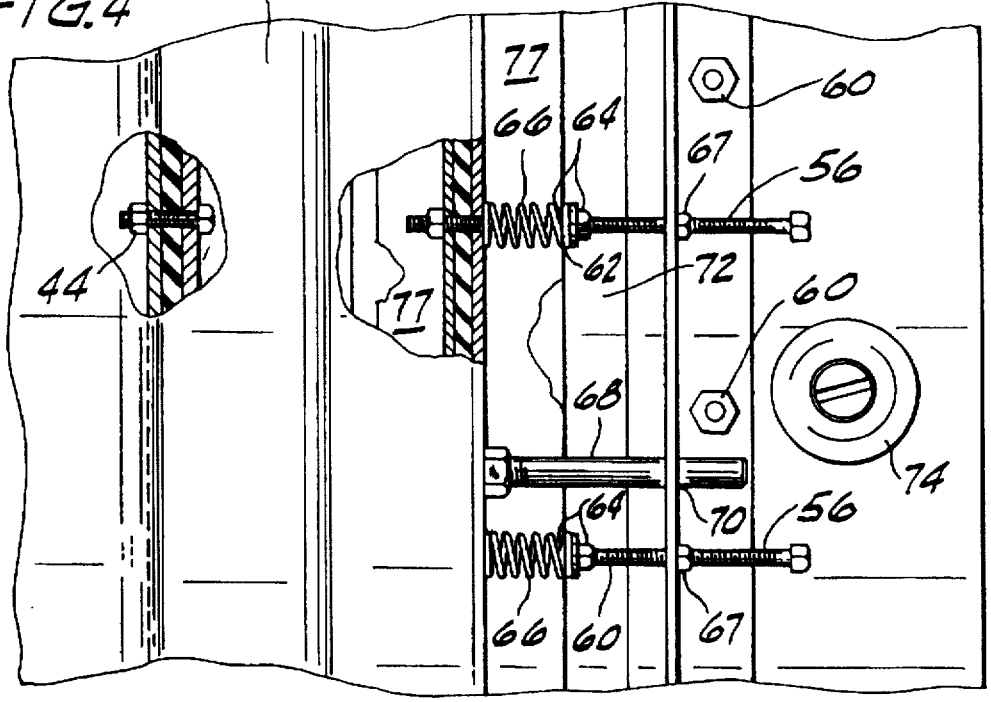
FIG. 4 is an enlarged partial plan view of the piston with portions broken away.

Referring to the drawings, an elongate tank of the present invention is designated generally by the reference numeral 20. As shown in FIG. 1, the tank has a combination inlet and outlet port 22 at one end (hereinafter designated the forward end for convenience only) for filling and emptying tank 20 with semisolid material, such as grease or ground or comminuted food products, or fluid materials, such as oil or printers ink.

Tank 20 has a generally cylindric interior surface 21 with a generally circular cross-section throughout its length. Tank 20 may be mounted on a semitrailer (not shown) for transporting the material or may be stationary for storage of the material. A tank designed to be mounted on a semitrailer typically may have an interior diameter of approximately 68 inches and a length of 42 feet. A tank used primarily for storage may be larger or smaller and may be oriented vertically instead of horizontally. A generally cylindric piston, designated generally at 24, is dimensioned for slidable movement in tank 20 along a central axis X of tank 20. The piston 24 may be moved axially toward the forward end (left in FIG. 1) by increased air pressure on its rearward side (right in FIG. 1) to force material in the tank through port 22. Piston 24 may be moved axially rearwardly by pumping the material into port 22 or by creating a negative pressure on the rearward side of piston 24 to draw the material into the tank through port 22.

Piston 24 includes a piston member 26 and an elastic annular seal 28. The piston member 26 includes a head 30 at its forward end and a body or skirt 32 of somewhat reduced diameter extending rearwardly of head 30. The piston member 26 may be made of metal or fabricated of synthetic resin. Preferably, the head 30 is configured for complementary engagement with an interior contour 34 of the forward end of tank 20 so that the contained material may be efficiently and completely forced through the outlet (i.e., when the piston head comes into contact with the interior contour, no substantial amount of the material is left in the tank). For example, the head 30 of the piston member may be convex and the complementary interior contour 34 may be concave.

Seal 28 is formed of unreinforced synthetic rubber, such as VITON®, neoprene, or a Buna-N (nitrile) rubber having a hardness, for example, of approximately 65 durometer (Shore A scale). Seal 28 has an annular crown 36 disposed radially outward from the piston member and a pair of spaced apart legs 38 and 40 supporting the crown. Preferably, crown 36 and legs 38 and 40 are of integral one-piece construction. Leg 38 is sandwiched between an annular steel ring 42 and the rear surface of piston head 30 and secured by bolts 44 or the like to the rear surface of piston head 30. Crown 36 has an inwardly facing surface 46 with a central peripheral notch 48 and an outwardly facing ridged surface 50.

Leg 40 is held captive, sandwiched between flanged rings 52 and 54 which are secured together by bolts 55. The flanged rings 52 and 54 and leg 40 are movable toward and away from leg 38 to cause crown 36 to be moved with varying pressure against interior surface 21 of tank 20. The legs 38 and 40 are squeezed together by bolts 56 which are threaded through a flanged ring 58 secured to the skirt 32 by bolts 60. The forward end of each of the bolts 56 carries a washer 62 sandwiched between two nuts 64 and which bear against a coil spring 66 the other end of which surrounds the head of one of the bolts 55. The bolts 56, washers 62 and springs 66 constitute means for squeezing together legs 38 and 40. As leg 40 is moved toward leg 38 crown 36 is moved outwardly to cause it to be pressed against the interior surface 21 of tank 20 with a pressure such that when the piston member 26 slides in the tank 20 a portion of the crown 36 is maintained in continuous sliding engagement with the interior surface thereby to wipe the material therefrom and to seal the piston member relative to tank 20. Optionally, studs 68 are provided as guides to project rearwardly from flanged ring 54, to which the forward ends are secured, through aperture 70 in flanged ring 58.

A band of Teflon or Teflon impregnated fabric 72 surrounds the skirt and extends beyond the undersurfaces of the flanged rings 52 and 54 and between skirt 32 and those undersurfaces so that the flanged rings may be moved easily relative to skirt 32 and toward and away from leg 38.

When, as piston 24 is moved axially forward relative to tank 20, crown 36 engages tank imperfections of the type which result in a reduced diameter of interior surface 21 (as depicted in FIG. 3), crown 36 flexes radially inward and tends to narrow notch 48. Inward flexing of crown 36 helps minimize the rubbing force of crown 36 against interior surface 21, thereby increasing the life of seal 28.

An exemplary seal for a tank having an interior diameter of approximately 66 inches has an inner diameter (i.e., diameter of the inwardly facing surfaces of legs 38 and 40) of 63 inches, a thickness T of 1⅝ inches (prior to insertion in the tank), and an axial width SW of 3¾ inches. Thus, prior to insertion in the tank seal 28 has an outer diameter (i.e., ridge diameter) of 66¼ inches—¼ inch larger than the interior diameter of the tank. Since the outer diameter of the seal is preferably slightly larger than the tank diameter, the seal must be contracted slightly during insertion into the tank. However, because of its configuration (described above), the seal is sufficiently flexible to facilitate insertion of the piston 24 into the tank. After insertion of the piston into the tank, bolts 56 are advanced by a torque wrench or the like calibrated in inch/pounds to compress springs 66 and squeeze together legs 38 and 40 which increases the pressure of crown 36 against the interior surface 21 of the tank so that material is wiped from the interior surface 21 as the piston is moved axially in the tank and to seal the piston member 34 the bolts 56 are locked into position by tightening nuts 67 against flanged ring 58 relative to the tank. Exemplary seal 28 will accommodate imperfections in the tank which vary the tank diameter by as much at least 1½ inches.

As shown in FIGS. 1 and 3, anti-canting members, such as pads 74 are fastened (e.g., by bolts 75 having recessed heads and biasing springs 76) to piston body or shirt 32 and extend radially outwardly therefrom beyond the periphery of the piston body for engagement with the interior surface 21 of the tank to hold piston member 26 against canting in tank 20. The pads are of low friction material (e.g., nylon), thereby permitting the piston member to slide freely in the tank. Avoidance of any canting of the piston is further prevented, for example, by a second ring of anti-canting spring-loaded stabilizer bars 77 mounted on a rearwardly extending skirt extension 79. This extension is secured to skirt 32 by a series of bars 81, each welded to a saddle 83 which in turn are welded to the skirt 32 and extension 79.

The pads have a thickness (radially of piston body) of somewhat less than one-half of the difference between the diameter of the piston body and the interior diameter of the tank. For example, if the diameter of the piston body is approximately 63 inches and the interior diameter of the tank approximately 66 inches, that the thickness of each pad is approximately 1¼ inches. Also, the pads may be approximately 3 inches long (circumferentially of the piston body) and 1½ inches wide (axially of piston body).

As shown in FIG. 1, pads 77 are spaced axially of the piston member 26 and rearwardly from the seal 36 a distance C sufficient to prevent canting of the piston. Each pad may be spaced within its row at approximately uniform distances from the nearest other pads (e.g., at 30 degree intervals around the circumference of the piston body). While two rows of pads are preferred, other arrangements are possible which also prevent canting of the piston 24.

It will be observed from the foregoing that the piston is easily installed in the tank, is self-cleaning, and improved in performance, and that the seal resists wear and requires little if any servicing.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an elongate tank for transport or for storage in bulk of semisolid and fluid material, said tank having an outlet at one end thereof for discharging material contained therein, said tank having a generally cylindric interior surface, a generally cylindric piston sized to slide in the tank and adapted to be moved in a direction toward said outlet thereby to force the material in the tank through the outlet, said piston comprising:

a piston member;

an annular elastic seal carried by said piston member, said seal having an annular crown projecting radially outwardly from the piston member and engageable with the interior surface of the tank, said seal having a pair of spaced apart legs supporting said crown, and means for squeezing the legs together to move the crown outwardly and cause it to be pressed against the interior surface of the tank with a pressure such that when the piston member slides in the tank a portion of the crown is maintained in sliding engagement with the interior surface thereby to wipe the material therefrom and to seal the piston member relative to the tank; and at least one anti-canting member extending radially outwardly beyond the periphery of the piston member and spaced axially from the seal for engagement with the interior surface of the tank for holding the piston member against canting in the tank while permitting said piston member to slide freely in said tank.

2. A piston as set forth in claim 1 wherein said legs have substantially parallel outer surfaces, one of the legs being held fixed to the piston member and the other leg being movable both toward and away from the first leg to apply a squeezing action to said seal.

3. A piston as set forth in claim 2 wherein there is a circumferential flange around the piston member extending radially outwardly from the piston member and means for applying force to the movable leg from the circumferential flange to squeeze the legs together.

4. A piston as set forth in claim 3 wherein the means for applying said force comprises a plurality of bolts threaded through the circumferential flange and springs positioned between the ends of the bolts and the movable leg.

5. A piston as set forth in claim 4 wherein said movable leg rides on a layer of teflon-impregnated fabric secured to the piston member.

6. A piston as set forth in claim 1 wherein the crown has an inner surface having a central notch whereby when the seal is squeezed the outer surface of the crown is pressed against the interior surface of the tank and the inner surface of the crown can easily compress.

7. A generally cylindric piston for use in an elongate tank for transport or for storage in bulk of semisolid and fluid material, said tank having an outlet at one end thereof for discharging material contained therein, said tank having a generally cylindric interior surface, said piston being sized to slide in the tank and adapted to be moved in a direction toward said outlet thereby to force the material in the tank through the outlet, said piston comprising:

a piston member;

an annular elastic seal carried by said piston member, said seal having an annular crown projecting radially outwardly from the piston member and engageable with the interior surface of the tank, said seal having a pair of spaced apart legs supporting said crown, and means for squeezing the legs together to move the crown outwardly and cause it to be pressed against the interior surface of the tank with the pressure such that when the piston member slides in the tank a portion of the crown is maintained in sliding engagement with the interior surface thereby to wipe the material therefrom and to seal the piston member relative to the tank; and at least one anti-canting member extending radially outwardly beyond the periphery of the piston member and spaced axially from the seal for engagement with the interior surface of the tank for holding the piston member against canting in the tank while permitting said piston member to slide freely in said tank.

8. A piston as set forth in claim 7 wherein said legs have substantially parallel outer surfaces, one of the legs being held fixed to the piston member and the other leg being movable both toward and away from the first leg to apply a squeezing action to said seal.

9. A piston as set forth in claim 8 wherein there is a circumferential flange around the piston member extending radially outwardly from the piston member and means for applying force to the movable leg from the circumferential flange to squeeze the legs together.

10. A piston as set forth in claim 9 wherein the means for applying said force comprises a plurality of bolts threaded through the circumferential flange and springs positioned between the ends of the bolts and the movable leg.

11. A piston as set forth in claim 10 wherein said movable leg rides on a layer of teflon-impregnated fabric secured to the piston member.

12. A piston as set forth in claim 7 wherein the crown has an inner surface having a central notch whereby when the seal is squeezed the outer surface of the crown is pressed against the interior surface of the tank and the inner surface of the crown can easily compress.

* * * * *